March 27, 1951  J. W. MYERS  2,546,471
THERMOSTATIC SWITCH
Filed Aug. 26, 1948
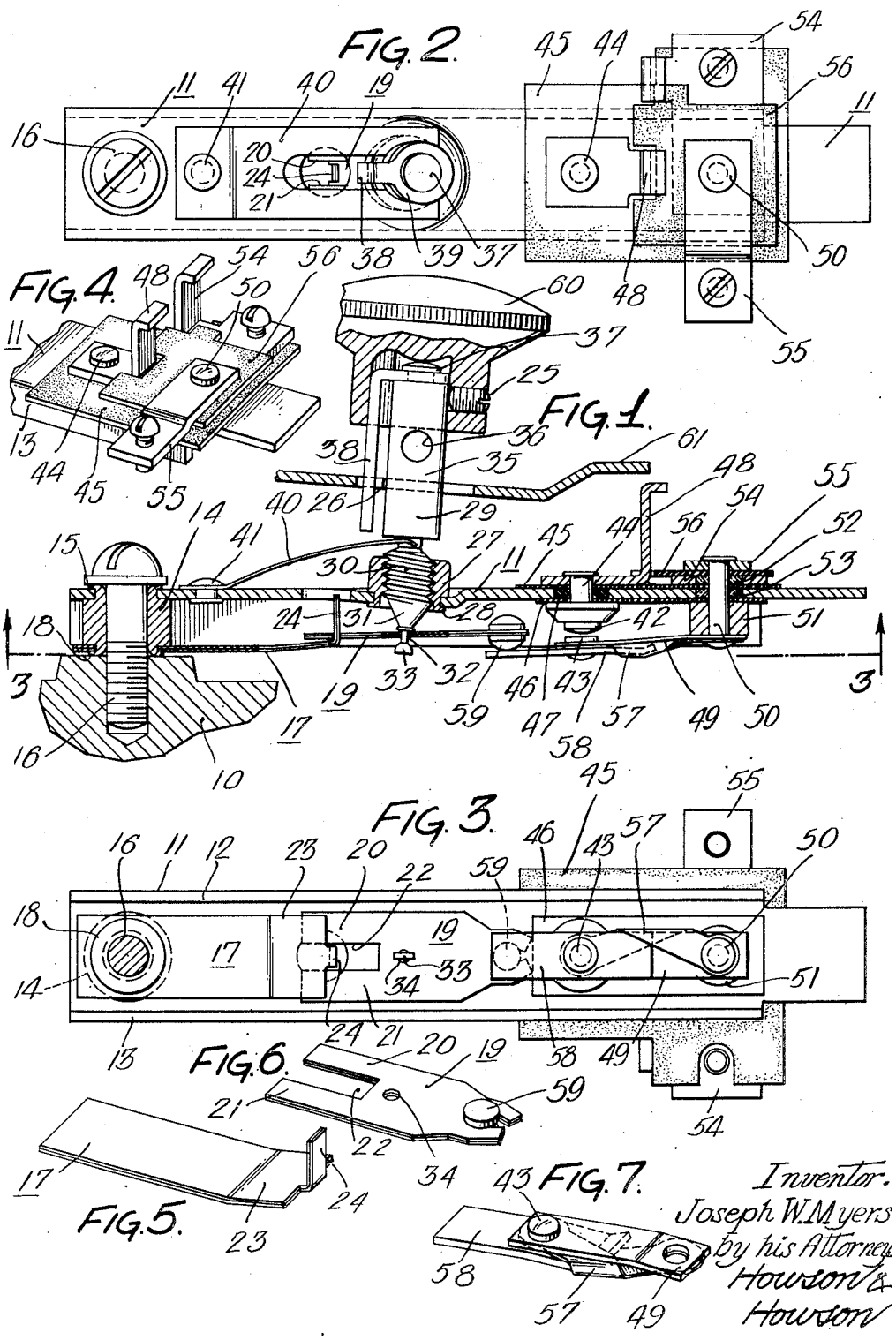
Inventor.
Joseph W. Myers
by his Attorney
Howson &
Howson Patented Mar. 27, 1951

2,546,471

UNITED STATES PATENT OFFICE 2,546,471

THERMOSTATIC SWITCH

Joseph W. Myers, Philadelphia, Pa., assignor to Proctor Electric Company, Philadelphia, Pa., a corporation of Pennsylvania Application August 26, 1948, Serial No. 46,319

10 Claims. (Cl. 200—139)

This invention relates to thermostatic control mechanisms of the type embodying compensating means. Mechanisms of this general character are now commonly employed in household electrical heating appliances such as flat-irons, toasters, etc. Such a mechanism generally comprises a main thermomotive element which is intended to respond primarily to the temperature of the object or body being heated, a compensating thermomotive element which is intended to respond primarily to the ambient or environmental temperature of the device in which the mechanism is employed, and a switch controlled by the conjoint action of the two thermomotive elements.

In some appliances, the space limitations make it difficult to employ a compensating thermostatic control mechanism. This is particularly true of flat-irons which generally afford a very limited amount of space vertically within the housing or enclosure formed by the sole plate and the cover or shell associated therewith. Consequently, it has been difficult in the past to provide a suitable compensating thermostatic control mechanism within the narrow vertical confines of a flat-iron.

The principal object of the present invention is to provide a novel compensating thermostatic control mechanism which requires only a small amount of space in one direction and which is especially suitable for use in a flat-iron.

Another object of the invention is to provide such a thermostatic control mechanism which is simple in construction and may therefore be manufactured economically, and which is capable of easy assembly.

A further object of the invention is to provide a thermostatic control mechanism which is readily adjustable to give the desired operating temperature range.

Other objects and features of the invention will be apparent from the following detailed description with reference to the accompanying drawing, wherein Fig. 1 is a sectional view taken longitudinally through a thermostatic control mechanism constructed according to the present invention;

Fig. 2 is a plan view of said mechanism;

Fig. 3 is a bottom view taken along line 3—3 of Fig. 1;

Fig. 4 is a fragmentary perspective view of the rear portion of the mechanism; and Figs. 5 to 7 are perspective views of certain of the elements.

Referring more particularly to the drawing, the thermostatic control mechanism is shown in Fig. 1 in association with a portion of a body 10 to be heated which may be regarded as a portion of the sole plate of an electrically heated flat-iron. For the present purpose therefore, it may be assumed that the thermostatic control mechanism is intended to be employed in a flat-iron, although it will be understood that the mechanism may be employed in any device wherein it may find useful application. As applied to a flat-iron, it will be understood that the thermostatic control mechanism will be disposed within the housing or casing of the iron.

The thermostatic control mechanism is constructed and assembled as a unit, the parts of which are carried by an elongate rigid support member 11 which is preferably of inverted channel shape having depending side flanges 12 and 13. At one end of the support member 11, there is provided a depending hollow support element 14 which is riveted over at 15 to secure the same to the support member 11. The entire thermostatic control unit is attachable to the body 10 by means of a screw 16 passing through the hollow element 14.

Secured to the lower end of element 14 is a main thermomotive element 17 which may be in the form of a bimetal strip. One end of this strip is fixedly secured to element 14 as by riveting over the lower portion of said element at 18. It will be noted that the thermomotive strip 17 is generally parallel to support 11, extending substantially horizontally when the mechanism is mounted in a flat-iron. It will be noted further that the thermomotive strip 17 is in good heat conductive relation with the body 10 so as to receive heat therefrom. The bimetal strip 17 is adapted to flex upward in response to such heat in well-known manner.

A compensating thermomotive element 19, which may also be a bimetal strip, extends from the free end of the main thermomotive strip 17 substantially in horizontal alignment therewith. One end of the strip 19 is loosely pivotally engaged by the free end of the strip 17. As may be clearly seen in Figs. 5 and 6, one end of the strip 19 is bifurcated to provide spaced arms or fingers 20 and 21 defining a slot 22. The associated end of strip 17 is slightly inclined upwardly at 23 and has a vertically projecting finger 24 which extends upward through the slot 22.

Intermediate the ends of the compensating bimetal strip 19, there is provided a suspension fulcrum for the said strip. As may be seen in Fig. 1, a hollow internally threaded support element 27 is mounted on the rigid support member 11 as by riveting over as at 28. The element 27 carries a spindle or shaft 29 having a threaded portion 30 threadedly engaging the element 27. Below the threaded portion 30, the spindle 29 is tapered at 31 and terminates in a pin-like end 32 having an enlarged head 33. The pin-like portion extends loosely through an aperture 34 provided in the bimetal strip 19. The assembly of these parts may be accomplished by first providing a simple pin-like end on the spindle 29, inserting said end through the aperture 34, and then swedging the end of the pin-like projection to form the head 33. This arrangement provides a loose fulcrum mounting for the strip 19.

Above the threaded portion 30, the spindle 29 has a cylindrical portion 35 which is transversely apertured at 36. At the top of the cylindrical portion 35, there is a narrower projecting portion 37. A depending arm or finger 38 is supported at the top of the cylindrical portion 35 by means of a transverse ring-shaped portion 39 (see Fig. 2) which fits over the extension 37, the latter being riveted over to secure the arm 38 frictionally to the spindle 29.

It will be seen that by rotating the spindle 29 the fulcrum of strip 19 may be raised or lowered. The purpose of this is to provide adjustment of the thermostatic control mechanism to give operation of the device being controlled at a selected temperature within a predetermined operating range. Thus, in the case of a flat-iron, adjustment of the operating temperature according to the character of the material being ironed is desirable. The rotation of the spindle 29 is effected by means of a control knob 60 which fits over the upper part of the spindle 29 and is recessed to receive the upper part of finger 38, the latter serving as an indexing means as described later. The lower part of finger 38 cooperates with a stop 26 on the cover 61 to limit the rotation of spindle 29 in either direction. A bifurcated leaf spring 40 is riveted to the support member 11 at 41, and the bifurcated end of said spring engages the lower part of the cylindrical portion 35. The purpose of this spring is to maintain the spindle 29 in any position to which it is adjusted.

Adjacent the compensating bimetal element 19, and in substantial horizontal alignment therewith, is a control switch which is supported by the rigid support member 11. This switch comprises a stationary contact 42 and a movable contact 43. The stationary contact is provided at the lower end of a rivet 44 secured to member 11 and insulated therefrom by insulating sheets 45 and 46 and an insulating washer 47. A terminal element 48 is held by the rivet 44 and is likewise insulated from the support member 11.

The movable contact 43 is carried at the end of a spring finger 49, the resilience of which tends to maintain the contact 43 in engagement with the contact 42. This spring finger is carried at the lower end of a rivet 50 and is spaced from the support member 11 by a spacer element 51. The insulating plates 45 and 46 extend beyond the rivet 50, and there are also provided insulating washers 52 and 53. At the upper end of the rivet 50, there are secured terminal elements 54 and 55 which are insulated from one another by an insulating plate 56.

Since the spring 49 is not intended to serve as an electrical conductor and may not be a very efficient conductor, it is preferred to assure good electrical connection between contact 43 and rivet 50 by the provision of a highly conductive strip 57 extending therebetween, which strip may be in the nature of a metal foil. Also secured to the contact 43 and the free end of spring 49 is a finger 58 which projects beneath the adjacent end of strip 19. The latter carries an insulating button 59 immediately above the projecting end of finger 58 and engageable therewith.

The present invention is not concerned with the specific electrical connections, and it suffices to note that the switch 42, 43 is included in the circuit of the electrical heating means (not shown) associated with the heatable body 10. The thermostatic control mechanism provided by the invention controls the heating of the body 10 by controlling the operation of the switch 42, 43.

Considering the operation of the thermostatic control mechanism, when the adjustable spindle 29 is moved to its lowermost position, which is the "off" position, strip 19 is moved downward, fulcruming about its left end which is supported by the strip 17. Consequently, the button 59 at the right end of strip 19 opens the switch contacts through the medium of finger 58 against the resilience of spring 49.

When spindle 29 is adjusted upwardly from the "off" position, the strip 19 is raised, permitting the switch contacts 42, 43 to close under the influence of spring 49. The heating circuit for the body 10 is thus completed and the temperature of said body rises. The main thermomotive strip 17 is affected primarily by the temperature of the heated body 10 and flexes upwardly in response thereto. This causes leverwise movement of strip 19 about its fulcrum in a clockwise direction until the button 59 opens the switch contacts. As the bimetal strip 17 cools, the switch contacts are permitted to move toward one another and to close, whereupon the cycle is repeated.

During the first cycle of operation of the device being controlled, e. g., a flatiron, the main thermomotive element does not attain its maximum deflection for a particular temperature setting of the control knob 60. This is in a large part attributable to the fact that the body 10 and, in turn, the main thermomotive strip 17 attached to said body because of their finite thermal inertias do not immediately reflect the temperature of the heating means associated with said body. Moreover, at the time that the switch 42, 43 first opens, the ambient or environmental temperature within said device has not had a chance to attain its steady state value and therefore does not affect the temperature of the thermomotive strip 17 so that it will have its maximum deflection. These factors contribute to what has been well known in the art as "overshoot," which condition would be present in this device were it not for the compensating thermomotive element 19. The strip 19 is primarily affected by the ambient or environmental temperature and, being loosely associated with strip 17, is very little affected by heat conducted along strip 17 from the body 10. As the ambient or environmental temperature rises, the ends of the strip 19 flex slightly upward so as to compensate for the flexure of the main bimetal strip 17 caused by the factors stated above. Consequently, the operation of switch 42, 43 is such as to keep the temperature of the body 10 at the desired value in accordance with the setting of control knob 60.

It will be apparent that the adjustment of spindle 29 will determine the operating point of switch 42, 43, i. e. the temperature of the body 10 at which the switch will be opened. The movement up or down of the fulcrum of the compensating strip 19 varies the required clockwise lever movement of strip 19 to effect opening of the switch contacts.

An important feature of the mechanism is the "in line" arrangement of the main thermomotive strip, the compensator strip and the switch. This arrangement affords a maximum range of thermostatic movement and adjustment in a limited vertical space.

It should be noted further that the arrangement of the parts of the thermostatic mechanism is conducive to economy of materials and assembly time. As applied to a flat-iron, the mounting screw 16 is at the front, the adjustment elements are centrally located, and the wiring terminals are at the rear.

Mention has been made of the indexing function of the finger 38, which has to do with a factory adjustment and will now be explained. It is essential that the operating knob 60 be properly correlated with the thermostatic mechanism in order that rotation of the knob according to indicia on or associated with the knob will effect the proper adjustment of the thermostatic mechanism. The finger 38 enables and facilitates such correlation. With the knob 60 removed, the finger 38 may be moved against the "off" stop and held there while the spindle 29 is forcibly turned to the switch opening position. This may be done by inserting a simple tool in hole 36. The knob 60 is then applied, the finger 38 keying it in the proper position, and the set screw 25 is tightened.

In constructing a thermostatic control mechanism of the character herein disclosed, it is important that the bimetal elements be of the proper design to give optimum performance. By way of example, in a commercial embodiment of the invention the bimetal elements are structurally characterized as follows. The main bimetal element has a thickness of .022", an effective length of $7/8$" and a width of $7/16$". Its high expansion side is composed of an alloy comprising 18% nickel, 11% chromium and the balance iron. Its low expansion side is composed of 42% nickel and the balance iron. The compensating bimetal element has a thickness of .025", an effective length of $1 1/8$" and a width of $7/16$". Its high expansion side is composed of 19% nickel, 2% chromium and the balance iron. Its low expansion side is composed of 36% nickel and the balance iron. It was found important for obtaining optimum performance and for the elimination of "overshoot" to use a compensating bimetal which had a reduced sensitivity as the temperature level was increased. The particular rate of deflection per unit increase in temperature characteristic of the bimetallic material described above was found to be highly satisfactory.

From the foregoing description it will be seen that the invention provides a novel thermostatic control mechanism having the advantages hereinbefore mentioned. While a particular embodiment has been shown and described, it will be understood that the invention is not limited thereto but is capable of various modifications and other embodiments.

I claim:

1. A thermostatic control mechanism, comprising a rigid elongate support member, a first thermomotive strip extending generally parallel to said member and having one end fixedly supported by said member, a second thermomotive strip extending from the other end of said first strip generally parallel to said member, said second strip having one end loosely pivotally engaged by said other end of the first strip, an adjustable element on said member providing an adjustable fulcrum for said second strip intermediate the ends thereof, whereby said second strip may be moved leverwise by said first strip, a switch supported by said member adjacent said second strip in substantial alignment therewith and operatively engaged by said second strip, an indexing element frictionally engaging said adjustable element, and a manual adjustment element mounted on said adjustable element and indexed thereon by said indexing element.

2. In a thermostatically controlled device, a first thermomotive element supported for flexing movement, a second thermomotive element interengaged with said first element for actuation thereby, switch means controlled by said second element, an adjustable element providing an adjustable fulcrum for said second element, an indexing and stop element frictionally engaging said adjustable element, a manual adjustment element mounted on said adjustable element and indexed thereon by said indexing and stop element, and stationary stop means engageable by said indexing and stop element to limit the movement of said adjustable element.

3. In a thermostatically controlled device, a first thermomotive strip having one end anchored and its other end free for movement, a second thermomotive strip extending from the free end of said first strip substantially in alignment with said first strip, said second strip having one end loosely pivotally engaged by the free end of said first strip for actuation thereby, switch means controlled by said second strip, an adjustable element providing an adjustable fulcrum for said second strip, an indexing and stop element frictionally engaging said adjustable element, a manual adjustment element mounted on said adjustable element and indexed thereon by said indexing and stop element, and stationary stop means engageable by said indexing and stop element to limit the movement of said adjustable element.

4. In a thermostatically controlled device, a rigid elongate support member, a first thermomotive strip extending generally parallel to said member and having one end fixedly supported by said member, a second thermomotive strip extending from the other end of said first strip generally parallel to said member, said second strip having one end loosely pivotally engaged by said other end of said first strip, an adjustable element on said member providing an adjustable fulcrum for said second strip intermediate the ends thereof, whereby said second strip may be moved leverwise by said first strip, a switch supported by said member adjacent said second strip in substantial alignment therewith and operatively engaged by said second strip, an indexing and stop element frictionally engaging said adjustable element, a manual adjustment element mounted on said adjustable element and indexed thereon by said indexing and stop element, and stationary stop means engageable by said indexing and stop element to limit the movement of said adjustable element.

5. A thermostatic control mechanism for controlling the temperature of an electrically heated body, comprising a main thermomotive strip arranged to receive heat from said body and having one of its ends anchored and its other end free for movement, a compensating thermomotive strip having one end pivotally engaged by the free end of said first strip, means providing a fulcrum for said second strip intermediate its ends, whereby said second strip may be moved leverwise by said first strip, and a switch operable by the other end of said second strip to control the electrical heating of said body.

6. A thermostatic control mechanism for controlling the temperature of an electrically heated body, comprising a main thermomotive strip arranged to receive heat from said body and having one of its ends anchored and its other end free for movement, a compensating thermomotive strip extending from the free end of said first strip in substantial alignment therewith, and having one end pivotally engaged by the free end of said first strip, means providing a fulcrum for said second strip intermediate its ends, whereby said second strip may be moved leverwise by said first strip, and a switch operable by the other end of said second strip to control the electrical heating of said body.

7. A thermostatic control mechanism for controlling the temperature of an electrically heated body, comprising a main thermomotive strip arranged to receive heat from said body and having one of its ends anchored and its other end free for movement, a compensating thermomotive strip extending from the free end of said first strip in substantial alignment therewith, and having one end pivotally engaged by the free end of said first strip, manually-adjustable means providing an adjustable fulcrum for said second strip intermediate its ends, whereby said second strip may be moved leverwise by said first strip, and a switch operable by the other end of said second strip to control the electrical heating of said body.

8. A thermostatic control mechanism for controlling the temperature of an electrically heated body, comprising a rigid elongate support member having provision for attachment to said body, a main thermomotive strip extending generally parallel to said member and having one end fixedly supported by said member to receive heat from said body, the other end of said strip being free for movement, a compensating thermomotive strip extending from the free end of said first strip generally parallel to said member, said second strip having one end loosely pivotally engaged by the free end of said first strip, means on said member providing a fulcrum for said second strip intermediate its ends, whereby said second strip may be moved leverwise by said first strip, and a switch supported by said member and operable by the other end of said second strip to control the electrical heating of said body.

9. A thermostatic control mechanism for controlling the temperature of an electrically heated body, comprising a rigid elongate support member having provision for attachment to said body, a main thermomotive strip extending generally parallel to said member and having one end fixedly supported by said member to receive heat from said body, the other end of said strip being free for movement, a compensating thermomotive strip extending from the free end of said first strip generally parallel to said member, said second strip having one end loosely pivotally engaged by the free end of said first strip, manually adjustable means on said member providing an adjustable fulcrum for said second strip intermediate its ends, whereby said second strip may be moved leverwise by said first strip, and a switch supported by said member and operable by the other end of said second strip to control the electrical heating of said body.

10. In an electrically-heated appliance having a casing or cover, thermostatic switch means within the appliance, a rotatable adjusting element for said switch means extending from within the appliance exteriorly of the casing thereof, an indexing and stop element frictionally engaging said adjusting element exteriorly of said casing, the exterior end of said adjusting element being swaged over said indexing and stop element to hold the latter in frictional engagement with the adjusting element, stationary stop means engageable by said indexing and stop element to limit movement of the latter, means on said adjusting element to receive a tool to effect forcible relative movement between the adjusting element and the indexing and stop element, and a manual member mounted on said adjusting element and indexed thereon by said indexing and stop element.

JOSEPH W. MYERS.

REFERENCES CITED

The following references are of record in the file of this patent:

UNITED STATES PATENTS

| Number | Name | Date |
|---|---|---|
| 1,927,934 | Ford | Sept. 26, 1933 |
| 2,128,807 | Ettinger | Aug. 30, 1938 |
| 2,195,649 | Hallenbeck et al. | Apr. 2, 1940 |
| 2,258,258 | Mikeska | Oct. 7, 1941 |
| 2,316,612 | Newell | Apr. 13, 1943 |